P. B. BOSWORTH.
FASTENING DEVICE FOR VEHICLE TIRES.
APPLICATION FILED APR. 27, 1907.
977,589.  Patented Dec. 6, 1910.
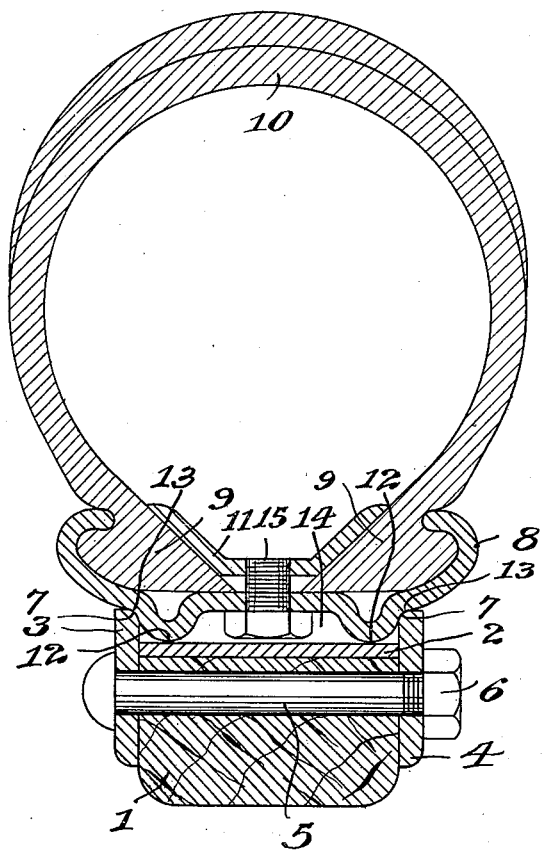

UNITED STATES PATENT OFFICE.

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

FASTENING DEVICE FOR VEHICLE-TIRES.

977,589.     Specification of Letters Patent.     Patented Dec. 6, 1910.

Application filed April 27, 1907. Serial No. 370,625.

*To all whom it may concern:*

Be it known that I, PERCY B. BOSWORTH, a citizen of the United States, residing at Akron, in the county of Summit and State of Ohio, have invented certain new and useful Improvements in Fastening Devices for Vehicle-Tires, of which the following is a specification.

This invention relates to the art of vehicle tires, and has reference more especially to new and improved means for securing the tires on the rims of the wheels.

The present invention pertains to that class of fastening devices wherein a supplemental or tire-seating rim is permanently associated with the tire, and is applied to and removed from the wheel rim or felly with the tire; and the invention consists principally in a novel construction of such tire-seating rim in association with means for demountably securing it on the wheel rim or felly in such a manner that it may be applied and removed sidewise of the latter.

The invention further consists in a construction of supplemental or tire-seating rim which permits the internal spreader whereby the base of a hollow tire is secured in its rim to be fastened without the necessity of aperturing the wheel rim or felly for the passage of such securing means.

The invention will be readily understood when considered in connection with the accompanying drawing which shows in cross-section the felly or rim of the wheel, a hollow tire, and my improved fastening devices applied thereto.

Referring to the drawings, 1 may designate the wooden felly of the wheel, which is herein shown surrounded by a plain metal band or rim 2 shrunk thereon.

3 and 4 designate, respectively, a pair of side-flange members that are secured to the felly by through-bolts 5 and nuts 6. These side-flanges, which may be integral rings or may be made in a plurality of sections, as desired, are apertured for the passage of the through-bolts 5, and at their outer margins are preferably rounded as indicated at 7 for the purpose hereinafter described.

8 designates the supplemental or tire-seating rim, herein shown as of a general channel form and provided with inwardly turned outer edges giving it the character of a clencher rim, although the particular form or construction of the rim in this regard is immaterial to the present invention. In this rim are seated the base-members or feet 9 of the well known internally split tire 10; the feet of the tire being pressed into close engagement with the clencher sides of the rim 8 by the usual spreaders 11.

In accordance with my present invention the base of the tire-seating rim 8 has formed thereon a pair of parallel inwardly projecting ribs 12 that have a bearing on the member 2 of the felly, being made of an internal diameter substantially equal to the external diameter of the rim 2 so as to have a sliding fit on the latter. For the sake of lightness and economy of metal, these ribs may conveniently be made hollow, as shown. Preferably, and as herein shown, the outer sides of the ribs are rounding in form so as to present concave seats 13 that are adapted to be engaged by the rounded corners 7 of the retaining flanges 3 and 4. The presence of the ribs 12 creates a channel 14 on the inner periphery of the rim 8, which channel may be utilized to accommodate the head of the short bolt 15 by which the spreader is secured in operative relation to the feet of the tire; thus avoiding the necessity of aperturing the felly for the passage of the usual through-bolts by which such spreader is secured.

From the foregoing it will be observed that in order to remove the tire it is necessary only to withdraw the nuts 6 and side-flange 4, whereupon the tire and rim 8 may be withdrawn laterally of the felly; the simple reverse of these operations effecting the application of the tire and securing the same in place. It will further be observed that the tire and its seating rim may be withdrawn and applied without disturbing the spreader 11. This is a distinct advantage, as it has heretofore been necessary to loosen the spreader by a retraction of its fastening bolt before the tire could be removed.

I claim:

In a vehicle wheel, the combination of a wheel felly, a wheel rim thereon, a demountable tire-seating rim having a pair of internal hollow ribs constituting the bearing portion of said tire rim on the wheel rim, each of said ribs having its bearing face transversely convexed to secure substantial line contacts between the rims, and side flanges, at least one of which is removably secured to the felly, and both of said flanges projecting radially beyond said wheel rim and engaging the adjacent ribs to demountably confine said tire rim on the wheel against lateral displacement, substantially as described.

PERCY B. BOSWORTH.

Witnesses:
F. R. TALBOTT,
G. C. CALBETZOR.